(12) United States Patent
Parsi et al.

(10) Patent No.: US 7,875,232 B2
(45) Date of Patent: Jan. 25, 2011

(54) SIMULTANEOUS NEGATIVE CAST AND SHELL FABRICATION FOR CUSTOM HEARING AIDS

(75) Inventors: Salman Parsi, Somerset, NJ (US); Scott Barry, Piscataway, NJ (US)

(73) Assignee: Siemens Hearing Instruments, Inc., Piscataway, NJ (US)

( * ) Notice: Subject to any disclaimer, the term of this patent is extended or adjusted under 35 U.S.C. 154(b) by 0 days.

(21) Appl. No.: 12/183,183

(22) Filed: Jul. 31, 2008

(65) Prior Publication Data

US 2010/0026775 A1 Feb. 4, 2010

(51) Int. Cl.
*B29C 35/04* (2006.01)
(52) U.S. Cl. .................. 264/401; 264/222; 264/493
(58) Field of Classification Search .......... 264/401, 264/493, 222
See application file for complete search history.

(56) References Cited

U.S. PATENT DOCUMENTS

| | | | |
|---|---|---|---|
| 6,259,962 B1 | 7/2001 | Gothait | |
| 6,850,334 B1 | 2/2005 | Gothait | |
| 7,174,028 B1 | 2/2007 | Niccolai | |
| 7,209,797 B2 | 4/2007 | Kritchman et al. | |
| 7,300,619 B2 | 11/2007 | Napadensky et al. | |

FOREIGN PATENT DOCUMENTS

EP 1912477 A2 4/2008

OTHER PUBLICATIONS

Objet Connex 500™ Apr. 21, 2008—pp. 1-5.
European Search Report in Application No. 09166454.0/2225 dated Nov. 12, 2009.

*Primary Examiner*—Joseph S Del Sole
*Assistant Examiner*—James Sanders

(57) ABSTRACT

In a method to create a hearing aid housing shell and a negative cast for a hearing aid to be fitted to a patient's ear canal, a 3D jet printer apparatus is provided able to build a 3D part by injecting both the soft material and a hard material with the soft material serving as a support for the hard material. The 3D file is input to the 3D jet printer apparatus to build the hearing aid shell with the hard material and the combined negative cast with the soft material. The negative cast is used to check a quality of the hearing aid shell and to add external features to the shell by fitting the shell into the negative cast.

14 Claims, 2 Drawing Sheets

SIMULTANEOUS NEGATIVE CAST AND SHELL FABRICATION FOR CUSTOM HEARING AIDS

BACKGROUND

In the manufacture of a hearing aid, it is necessary to create a housing containing components for the hearing aid wherein that housing comfortably fits within the ear canal.

Traditionally, a two-part silicon is injected by a technician into the ear canal/cavity where it hardens to create what is known as an impression. This impression is then removed from the patient's ear.

Thereafter, a so-called negative cast was created using clear silicon coated around the impression. This negative cast was then used as a quality tool and also used for adding external features to create what is known as an outer shell—the housing for the hearing aid components. These external features are to improve the retention of the final hearing aid in the ear cavity. These external features are made by applying a UV cured resin to the negative cast and to the shell.

More recently, it has been known to bypass the step of creating the negative cast to directly build the shell (hearing aid outer housing) by scanning the impression and creating a so-called point cloud (points around the outer peripheral surface of the impression). That point cloud was then used to create a so-called STL file. A STL file is a known file format native to the Stereolithography CAD software created by 3D Systems of Rock Hill, Carolina. This STL file is a detailed and modeled file which was then used in conjunction with such known Viper machine of 3D systems (also known as a Stereolithography Apparatus (SLA). The STL file is input into the machine and the machine then uses a UV-curable photopolymer resin and a UV laser to directly create the outer shell (component housing) as a hard material for the hearing aid without the use or creation of the negative cast. The stereolithography machine does this by building the part layer-by-layer from the resin and using a support material of the same resin to internally support the part being constructed by the SLA machine. This support material was like a scaffolding supporting the bottom of the shell and also around the shell, but not inside the shell. The support material on this Viper machine was always the same material as the shell and the support material were both hard materials. When the machine was finished processing the part, the support material was cut away and thus destroyed and discarded when exposing the internal shell.

A disadvantage of the above more recent method is that no negative cast is created or utilized. However, a negative cast is useful in serving as a quality control device so that when the final hearing aid housing (outer shell) is constructed, it could be fitted over the negative cast to determine whether the completed hearing aid housing (outer shell) was too loose, too tight, or had areas of insufficient clearance, all resulting in potential discomfort to the hearing aid user, or poor functionality of the hearing aid when it is placed in the ear canal. The negative cast is also used for checking cosmetic features of the final hearing aid.

With the earlier method where the negative cast was available, the shell (hearing aid housing) could be fitted onto the negative cast and one could check for undesirable rubbing or the too tight or too loose fit described above.

SUMMARY

It is an object to utilize digital imaging of the impression to create an STL file, but also to have the ability to create a negative cast for later quality control checks.

In a method to create a hearing aid housing shell and a negative cast for a hearing aid to be fitted to a patient's ear canal, a 3D jet printer is provided able to build a 3D part by injecting both the soft material and a hard material with, the soft material serving as a support for the hard material. The 3D file is fed to the 3D jet printer to build the hearing aid shell with the hard material and the combined negative cast with the soft material. The negative cast is used to check a quality of the hearing aid shell by fitting the shell into the negative cast.

DESCRIPTION OF THE PREFERRED EMBODIMENT

Figure 1:
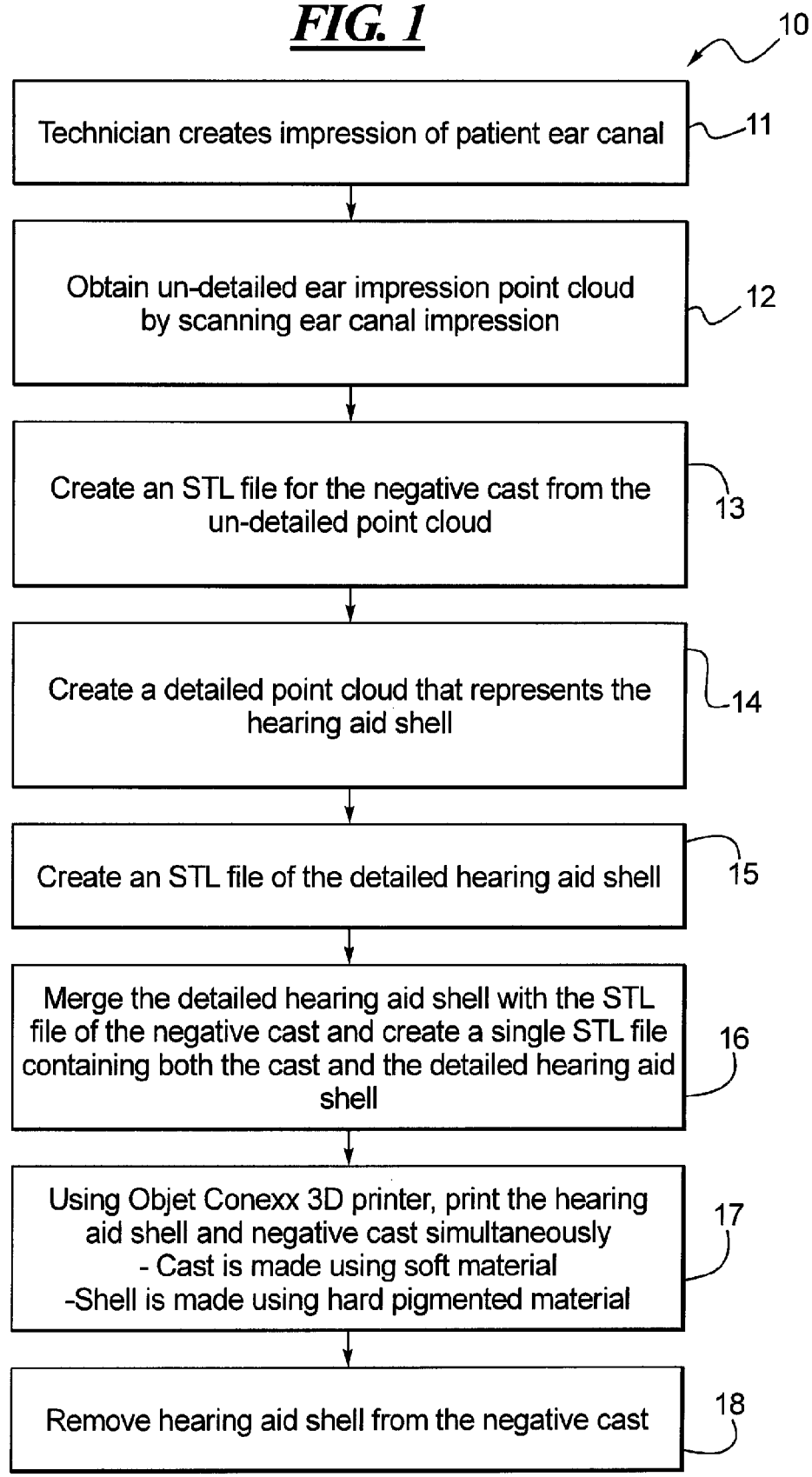
FIG. 1 is a block diagram of a method of a preferred embodiment to simultaneously create a negative cast and a shell, said shell being an outer housing of a custom hearing aid.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

With the system and method of a preferred embodiment, both a soft material negative cast and a hard material hearing aid housing shell can be fabricated simultaneously. Steps of the method are illustrated at 10 in FIG. 1.

Initially, the hearing aid technician creates the impression of the patient's ear canal, typically with a two-part silicon injection, which is then allowed to harden inside the ear canal, to create the desired impression for a custom fit for the hearing aid being provided for the patient. This is shown in Step 11.

In Step 12, the ear canal impression is scanned to obtain an un-detailed ear impression point cloud. A point cloud is known in the art as points on the peripheral surface obtained during the scanning process.

In Step 13, from the point cloud the computer generates an STL format data file. The STL file describes the surface geometry of the three-dimensional object.

In Step 14, a detailed point cloud is created that represents the desired hearing aid shell (hearing aid housing for the hearing aid components).

In Step 15, the computer creates an STL file of the detailed hearing aid shell from the detailed point cloud.

The detailed hearing aid shell is merged with the STL file of the negative cast to create a single STL file containing both the cast and the detailed hearing aid (Step 16).

According to the preferred embodiment, Objet Connex 3D printer prints the hearing aid shell using a hard material while simultaneously supporting the shell with the negative cast simultaneously created from a softer more pliable material based on the input STL file. The commercially available Objet Connex used as the 3D jet printer machine makes the cast using a selected sufficiently soft material to allow removal of the shell without damaging the shape of the negative cast and the shell is made using hard pigmented material as is indicated in Step 17.

Although the Objet Connex 3D printer was previously known in the prior art, it was never previously used to create hearing aid products. Rather, it was used to create products from STL files made of a hard material and a same or different softer material was used as a support for the hard material of the part being built. Thereafter the support material was removed. It was previously known (but not for hearing aid parts) that this support material could be hard or soft.

Other rapid prototyping (RP) machines performing like the Objet Connex printer may also be used.

Significantly, because the support material selected is soft and pliable, it is possible to remove this material as the negative cast from around the shell without permanently deforming the negative cast. Although the hard material outer shell has the shape of the patient's inner ear canal at various undulations, because the negative cast is pliable it is able to be removed successfully from the hard material shell without significantly changing the shape of the negative cast.

The Objet Connex 3D printer is programmed such that the support material only is provided around the hearing aid shell and not inside of the hearing aid shell. Thus no support material needs to be removed from inside the shell.

As indicated at the last Step 18 in FIG. 1, the hearing aid shell is removed from the negative cast. The shell is then available for receiving components for the hearing aid.

Significantly, both the negative cast and the shell are created simultaneously whereas in the prior art the negative cast was not available. By having the negative cast available, this negative cast may be used to perform quality checks on the final hearing aid housing shell by placing the shell into the negative cast to ensure that the fit in the ear canal which the negative cast represents is not too tight or too loose. Since the negative cast simulates the person's inner ear canal, and the quality of the ultimate product is ensured for comfortable fit by the patient by testing the final shell housing against the negative cast to ensure that the housing is not too small or too large or that rough areas exist which could irritate the patient's ear.

With the prescribed process, the hearing aid shell and the negative cast are built simultaneously using the Object Connex 3D printer for the 3D jet printer. This process minimizes the amount of water soluble support needed for shell manufacturing and reduces manufacturing costs while providing the negative cast which can be used for quality purposes in the ultimate design of the housing (shell). The negative cast is also used to apply optional features to the final hearing aid.

Figure 2:
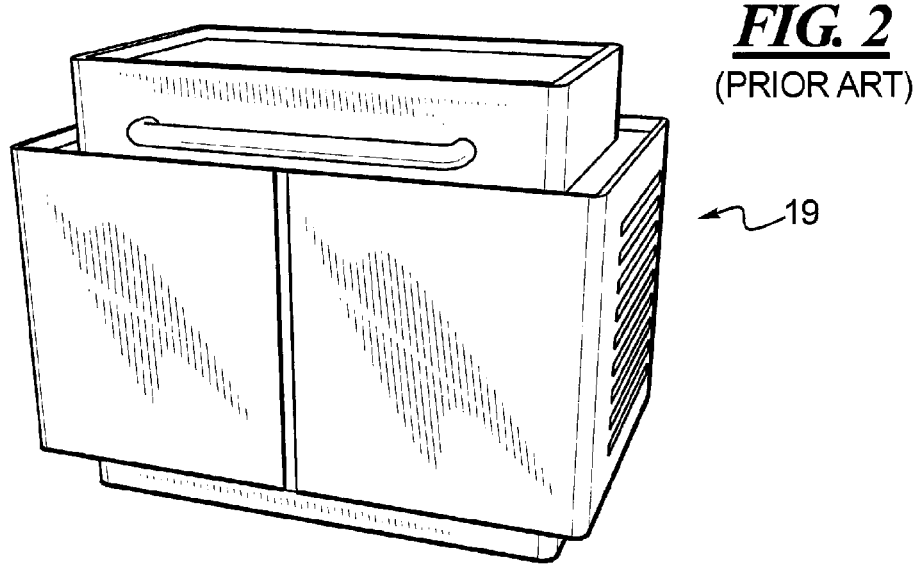
FIG. 2 is a perspective view of a prior art Objet Connex 3D printer used and operated in a new way with a specially selected softer support material to perform the method of the preferred embodiment to simultaneously build the negative cast for a hearing aid out of a softer and pliable support material along with the hearing aid shell constructed of a harder material.

As previously described, FIG. 2 shows an example of a 3D jet printer capable of jetting both hard and soft material simultaneously during the 3D layer-by-layer build. As indicated above, the unit 19 shown in FIG. 2 may be the prior art Objet Connex 3D printer.

Figure 3:
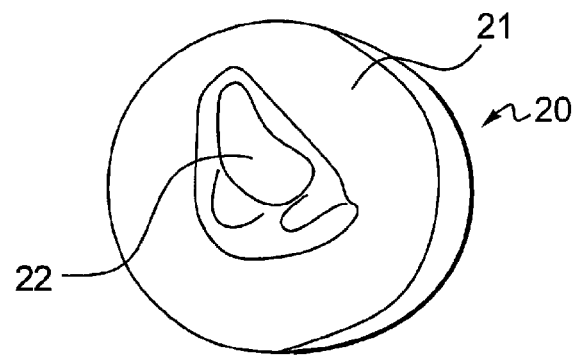
FIG. 3 is a top view of a hard material shell and soft material negative cast produced by the machine of FIG. 2.

FIG. 3 shows a combined part formed of both the shell 22 and the negative cast as a top view together after removal from the Objet Connex 3D jet printer machine.

Figure 4:
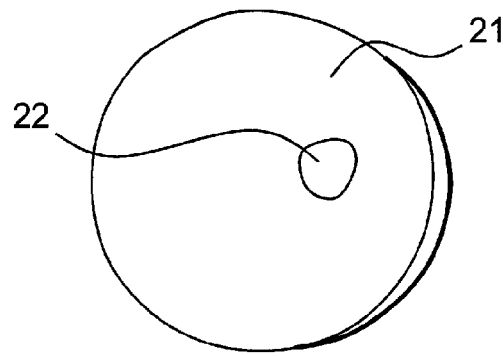
FIG. 4 is a bottom view of the hard material shell and soft material negative cast of FIG. 3.

FIG. 4 shows the same shell 22 and negative cast 21 of FIG. 3 but as a bottom view.

Figure 5:
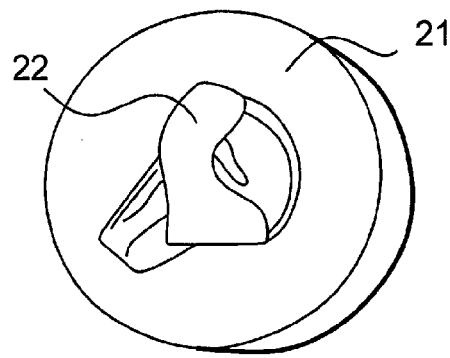
FIG. 5 is a top view of the shell of FIGS. 3 and 4 but with the shell positioned above, and removed from, the negative cast.

FIG. 5 shows the shell 22 removed from the negative cast 21 and positioned above the cast 21.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method to simultaneously create a detailed hearing aid outer housing shell and a negative cast for a hearing aid to be custom-fitted to a patient's ear canal, comprising the steps of:
   providing a 3D jet printer apparatus able to build a 3D part by injecting both a soft pliable material and a hard material substantially simultaneously with the soft pliable material serving as a support for the hard material;
   creating an impression of the patient's ear canal;
   scanning the ear canal impression to create an undetailed point cloud and creating a first 3D file for the negative cast from the undetailed point cloud;
   creating a detailed point cloud for the detailed hearing aid shell using the first 3D file and creating for the detailed hearing aid shell a second 3D file;
   merging the detailed hearing aid shell second 3D file with the negative cast first 3D file and creating a single merged 3D file containing both the negative cast and the detailed hearing aid shell;
   feeding the merged 3D file to the 3D jet printer apparatus to build the detailed hearing aid shell with the hard material and the combined negative cast substantially simultaneously with the soft material, the negative cast serving as a support for the hearing aid shell;
   removing the combined hearing aid shell and the negative cast from the printer apparatus and removing the shell from the negative cast without substantially permanently deforming the negative cast; and
   building the hearing aid using the hearing aid shell, and checking a quality of the hearing aid shell by fitting the shell into the negative cast.

2. The method of claim 1 wherein the soft material for the negative cast is designed to have a sufficient pliability to permit the hard material shell to be removed from the soft material cast without significantly changing a shape of the negative cast.

3. The method of claim 1 wherein the first 3D file, the second 3D file, and the merged 3D file all comprise STL files.

4. The method of claim 1 wherein the 3D jet printer apparatus comprises an Objet Connex 3D.

5. The method of claim 1 wherein the checking step further comprises determining whether the hearing aid shell would fit too tightly or too loosely in the patient's ear canal.

6. The method of claim 1 wherein the quality being checked comprises a comfortable fit of the hearing aid within the patient's ear canal.

7. A method to simultaneously create a detailed hearing aid outer housing shell and a negative cast for a hearing aid to be custom-fitted to a patient's ear canal, comprising the steps of:

providing a 3D jet printer apparatus able to build a 3D part by injecting both a soft pliable material and a hard material substantially simultaneously with the soft pliable material serving as a support for the hard material;

creating an impression of the patient's ear canal;

scanning the ear canal impression to create an undetailed point cloud and creating a first 3D file for the negative cast from the undetailed point cloud;

creating a detailed point cloud for the detailed hearing aid shell using the first 3D file and creating for the detailed hearing aid shell a second 3D file;

merging the detailed hearing aid shell second 3D file with the negative cast first 3D file and creating a single merged 3D file containing both the negative cast and the detailed hearing aid shell;

feeding the merged 3D file to the 3D jet printer apparatus to build the detailed hearing aid shell with the hard material and the combined negative cast substantially simultaneously with the soft material, the negative cast serving as a support for the hearing aid shell;

removing the combined hearing aid shell and the negative cast from the printer apparatus and removing the shell from the negative cast without substantially permanently deforming the negative cast; and building the hearing aid using the hearing aid shell, and using the negative cast to check a quality of the hearing aid shell by fitting the shell into the negative cast, and also to add external features to the hearing aid shell.

8. The method of claim 7 wherein 3D jet printer apparatus comprises an Objet Connex 3D printer.

9. A method of building a three dimensional object and a three dimensional negative cast of the object from geometric computer data representing the object and the negative cast, comprising:

gathering geometric computer data of the object and the negative cast of the object;

building the object with a first material using the geometric data gathered;

building the negative cast of the object with a second material using the geometric data gathered and substantially simultaneously with building the object, the second material being softer than the first material; and utilizing the negative cast as a support for the building of the object at the same time as the building of the negative cast.

10. The method of claim 9, wherein the second material for the negative cast is designed to have a sufficient pliability to permit the object made with the first material to be removed from the negative cast without significantly changing a shape of the negative cast.

11. The method of claim 9, wherein the steps are performed as steps in a stereolithography process.

12. The method of claim 9, wherein the steps are implemented by a multi-material 3D printing system.

13. The method of claim 9, wherein the object is a hearing aid outer housing shell for a hearing aid to be custom-fitted to a patient's ear canal.

14. The method of claim 13, wherein the gathering step comprises obtaining a physical impression of a patient's ear canal; digitally scanning the impression to obtain a point cloud of the impression and the patient's ear canal; and generating computer data in a format useable for performing the building and utilizing steps.

* * * * *